US007505836B2

(12) United States Patent
Okuyama et al.

(10) Patent No.: US 7,505,836 B2
(45) Date of Patent: Mar. 17, 2009

(54) INSPECTION SYSTEM FOR WATERCRAFT

(75) Inventors: Takashi Okuyama, Shizuoka (JP); Isao Kanno, Shizuoka (JP)

(73) Assignee: Yamaha Marine Kabushiki Kaisha, Hamamatsu-shi, Shizuoka-ken (JP)

( * ) Notice: Subject to any disclaimer, the term of this patent is extended or adjusted under 35 U.S.C. 154(b) by 358 days.

(21) Appl. No.: 11/195,246

(22) Filed: Aug. 1, 2005

(65) Prior Publication Data

US 2005/0267654 A1 Dec. 1, 2005

Related U.S. Application Data

(62) Division of application No. 10/247,919, filed on Sep. 20, 2002, now abandoned.

(30) Foreign Application Priority Data

Sep. 25, 2001 (JP) ............................ 2001-290902

(51) Int. Cl.
*G01M 17/00* (2006.01)

(52) U.S. Cl. ........................... 701/21; 701/29; 701/114; 340/459; 340/438; 440/84

(58) Field of Classification Search ................... 701/21, 701/29, 114; 340/459, 438; 440/84
See application file for complete search history.

(56) References Cited

U.S. PATENT DOCUMENTS 1,843,272 A 2/1932 Ole Evinrude (Continued)

FOREIGN PATENT DOCUMENTS

JP 01-119499 5/1989

(Continued)

OTHER PUBLICATIONS

International Standard, ISO 11783-5, First Edition May 1, 2001; *Tractors and Machinery for Agriculture and Forestry-Serial Control and Communications Data Network—Part 5: Network Management.*

(Continued)

*Primary Examiner*—Thomas G Black
*Assistant Examiner*—Wae Louie
(74) *Attorney, Agent, or Firm*—Knobbe Martens Olson & Bear, LLP

(57) ABSTRACT

A watercraft propelled by an outboard motor includes an inspection system. The inspection system includes a terminal computer that conducts an inspection of an engine control device and a control unit. The computer includes a program that performs an inspection process that provides the control device with a command signal to start an inspection of the control device and that requests the control device to output a first response signal. The process determines whether the response signal is consistent with a first specified signal. The process provides the control unit with a command signal to start an inspection of the control unit and requests the control unit to output a second response signal. The process determines whether the second response signal is consistent with a second specified signal. The control device controls a throttle actuator and a shift actuator based upon the second response signal and provides the inspection system with an operating signal. The process determines whether the operating signal is consistent with the second specified signal. The computer includes an indicator panel or other display device to show the results of the determinations made by the inspection process.

13 Claims, 8 Drawing Sheets

U.S. PATENT DOCUMENTS 2,204,265 A 6/1940 Wentzel
2,466,282 A 4/1949 Sparrow et al.
2,740,260 A 4/1956 Blanchard
3,986,363 A 10/1976 Beaman et al.
4,412,422 A 11/1983 Rossi
4,493,662 A 1/1985 Taguchi
4,497,057 A 1/1985 Kato et al.
4,527,441 A 7/1985 Nakahama
4,549,869 A 10/1985 Iida
4,570,776 A 2/1986 Iwashita
4,579,204 A 4/1986 Iio
4,622,938 A 11/1986 Wenstadt et al.
4,646,696 A 3/1987 Dogadko
4,648,497 A 3/1987 Prince
4,708,669 A 11/1987 Kanno et al.
4,747,381 A 5/1988 Baltz et al.
4,755,156 A 7/1988 Wagner
4,788,955 A 12/1988 Wood
4,796,206 A 1/1989 Boscove et al.
4,801,282 A 1/1989 Ogawa
4,805,396 A 2/1989 Veerhusen et al.
4,809,506 A 3/1989 Lauritsen
4,810,216 A 3/1989 Kawamura
4,822,307 A 4/1989 Kanno
4,836,809 A 6/1989 Pelligrino
4,843,914 A 7/1989 Korke
4,850,906 A 7/1989 Kanno et al.
4,858,585 A 8/1989 Remmers
4,898,045 A 2/1990 Baba
4,903,662 A 2/1990 Hirukawa
4,924,724 A 5/1990 Yoshimura
4,964,276 A 10/1990 Sturdy
4,973,274 A 11/1990 Hirukawa
5,004,962 A 4/1991 Fonss et al.
5,006,084 A 4/1991 Handa
5,050,461 A 9/1991 Onoue
5,051,102 A 9/1991 Onoue
5,059,144 A 10/1991 Onoue
5,062,403 A 11/1991 Breckenfeld et al.
5,062,516 A 11/1991 Prince
5,065,723 A 11/1991 Broughton et al.
5,072,629 A 12/1991 Hirukawa
5,076,113 A 12/1991 Hayasaka
5,103,946 A 4/1992 Masters et al.
5,127,858 A 7/1992 Pelligrino et al.
5,136,279 A 8/1992 Kanno
5,157,956 A 10/1992 Isaji et al.
5,167,212 A 12/1992 Peter et al.
5,201,238 A 4/1993 Hayasaka
5,231,890 A 8/1993 Hayasaka
5,245,324 A 9/1993 Jonker et al.
5,273,016 A 12/1993 Gillespie et al.
5,318,466 A 6/1994 Nagafusa
5,325,082 A 6/1994 Rodriguez
5,349,644 A 9/1994 Massey
5,352,138 A 10/1994 Kanno
5,381,769 A 1/1995 Nishigaki et al.
5,408,230 A 4/1995 Okita
5,445,546 A 8/1995 Nakamura
5,481,261 A 1/1996 Kanno
5,492,493 A 2/1996 Ohkita
5,539,294 A 7/1996 Kobayashi
5,556,312 A 9/1996 Ogino
5,556,313 A 9/1996 Ogino
5,575,698 A 11/1996 Ogino
5,595,159 A 1/1997 Huber et al.
5,597,334 A 1/1997 Ogino
5,630,256 A 5/1997 Kanno
5,664,542 A 9/1997 Kanazawa et al.
5,687,694 A 11/1997 Kanno
5,692,931 A 12/1997 Kawai
5,697,821 A 12/1997 Ogino
5,730,105 A 3/1998 McGinnity
5,749,343 A 5/1998 Nichols et al.
5,771,860 A 6/1998 Bernardi
5,782,659 A 7/1998 Motose
5,788,546 A 8/1998 Ogino
5,827,150 A 10/1998 Mukumoto
5,839,928 A 11/1998 Nakayasu
5,852,789 A 12/1998 Trsar et al.
5,899,191 A 5/1999 Rabbit et al.
5,904,604 A 5/1999 Suzuki
5,910,191 A 6/1999 Okamoto
5,935,187 A 8/1999 Trsar et al.
6,015,317 A 1/2000 Hoshiba et al.
6,015,319 A 1/2000 Tanaka
6,026,783 A 2/2000 Nestvall et al.
6,055,468 A 4/2000 Kaman et al.
6,058,349 A 5/2000 Kikori et al.
6,067,008 A * 5/2000 Smith ......................... 340/438
6,067,009 A * 5/2000 Hozuka et al. .............. 340/459
6,073,509 A 6/2000 Salecker et al.
6,073,592 A 6/2000 Brown et al.
6,085,684 A 7/2000 Cotton
6,095,488 A 8/2000 Semeyn, Jr. et al.
6,098,591 A 8/2000 Iwata
6,102,755 A 8/2000 Hoshiba et al.
6,109,986 A 8/2000 Gaynor et al.
6,123,591 A 9/2000 Onoue
6,141,608 A 10/2000 Rother
6,174,264 B1 1/2001 Hoshiba
6,217,400 B1 4/2001 Natsume
6,217,480 B1 4/2001 Iwata
6,233,943 B1 5/2001 Beacom et al.
6,273,771 B1 8/2001 Buckley et al.
6,280,269 B1 8/2001 Gaynor
6,351,704 B1 2/2002 Koerner
6,370,454 B1 4/2002 Moore
6,377,879 B2 * 4/2002 Kanno ......................... 701/29
6,379,114 B1 4/2002 Schott et al.
6,382,122 B1 5/2002 Gaynor et al.
6,414,607 B1 7/2002 Gonring et al.
6,487,983 B1 12/2002 Jonsson
6,529,808 B1 * 3/2003 Diem .......................... 701/29
6,536,409 B1 3/2003 Takahashi et al.
6,554,660 B2 4/2003 Irish
6,587,765 B1 7/2003 Graham et al.
6,595,811 B2 7/2003 Dagenais
6,599,158 B2 7/2003 Shidara et al.
6,612,882 B2 9/2003 Shidara et al.
6,615,160 B1 9/2003 Quinnett
6,647,769 B1 11/2003 Fujino
6,659,815 B2 12/2003 Motsenbocker
6,691,023 B2 * 2/2004 Fujino et al. ................ 701/114
6,704,643 B1 3/2004 Suhre et al.
6,751,533 B2 6/2004 Graham et al.
6,859,692 B2 * 2/2005 Okuyama .................... 701/21
6,872,106 B2 3/2005 Kanno
6,882,289 B2 4/2005 Motsenbocker
6,890,223 B2 5/2005 Kanno
6,910,927 B2 6/2005 Kanno
6,965,817 B2 11/2005 Graham et al.
6,997,764 B2 2/2006 Okuyama
7,108,570 B2 * 9/2006 Okuyama .................... 440/84
7,121,908 B2 10/2006 Okuyama
7,130,723 B2 10/2006 Minowa
7,142,955 B1 11/2006 Kern et al.
7,153,174 B2 12/2006 Takeda et al.
7,166,003 B2 1/2007 Motose
7,220,153 B2 5/2007 Okuyama
7,353,095 B2 4/2008 Kanno
2001/0049579 A1 12/2001 Fujino et al.
2003/0060946 A1 * 3/2003 Okuyama et al. ............. 701/21
2003/0060952 A1 * 3/2003 Kanno et al. .................. 701/29

| | | | | |
|---|---|---|---|---|
| 2003/0061076 | A1* | 3/2003 | Okuyama et al. | 705/4 |
| 2003/0092331 | A1 | 5/2003 | Okuyama | |
| 2003/0093196 | A1 | 5/2003 | Okuyama | |
| 2004/0029461 | A1 | 2/2004 | Shomura | |
| 2005/0118895 | A1 | 6/2005 | Kanno et al. | |
| 2005/0245145 | A1 | 11/2005 | Takada et al. | |
| 2005/0286539 | A1 | 12/2005 | Okuyama | |
| 2006/0240720 | A1 | 10/2006 | Yamashita et al. | |
| 2007/0082565 | A1 | 4/2007 | Okuyama | |
| 2007/0082566 | A1 | 4/2007 | Okuyama | |
| 2007/0178780 | A1 | 8/2007 | Ito et al. | |
| 2007/0218785 | A1 | 9/2007 | Okuyama | |
| 2007/0227429 | A1 | 10/2007 | Okuyama et al. | |
| 2007/0232162 | A1 | 10/2007 | Okuyama et al. | |
| 2007/0249244 | A1 | 10/2007 | Watanabe et al. | |
| 2007/0250222 | A1 | 10/2007 | Okuyama et al. | |
| 2007/0270055 | A1 | 11/2007 | Ito et al. | |
| 2007/0282490 | A1 | 12/2007 | Ito et al. | |
| 2007/0293102 | A1 | 12/2007 | Okuyama et al. | |
| 2008/0003898 | A1 | 1/2008 | Watanabe et al. | |

FOREIGN PATENT DOCUMENTS

| | | |
|---|---|---|
| JP | 03-061196 | 3/1991 |
| JP | 07-133733 | 5/1995 |
| JP | 11-334694 | 12/1999 |
| JP | 2001-107752 | 4/2001 |
| JP | 2001-260986 | 9/2001 |
| JP | 2003-098044 | 4/2003 |
| JP | 2003-127986 | 5/2003 |
| JP | 2003-146293 | 5/2003 |
| JP | 2004-036574 | 2/2004 |
| JP | 2004-068704 | 3/2004 |
| JP | 2004-244003 | 9/2004 |
| JP | 2004-286018 | 10/2004 |
| JP | 2005-161906 | 6/2005 |
| JP | 2005-297785 | 10/2005 |
| WO | WO 2005-102833 | 11/2005 |

OTHER PUBLICATIONS

NMEA 2000; Standard for Serial Data Networking of Marine Electronic Devices; Main Document: Version 1.000, Sep. 12, 2001; @NMEA 1999, 2000, 2001.

NMEA 2000; Standard for Serial Data Networking of Marine Electronic Devices; Appendix A: Version 1.000, Sep. 12, 2001; @NMEA 1999, 2000, 2001.

NMEA 2000; Standard for Serial Data Networking of Marine Electronic Devices; Appendix B: @NMEA 1999, 2000, 2001.

NMEA 2000; Standard for Serial Data Networking of Marine Electronic Devices; Appendix C: Version 1.000, Sep. 12, 2001; @NMEA 1999, 2000, 2001.

NMEA 2000; Standard for Serial Data Networking of Marine Electronic Devices; Appendix D: Version 1.000, Sep. 12, 2001; @NMEA 1999, 2000, 2001.

NMEA 2000; Standard for Serial Data Networking of Marine Electronic Devices; Appendix E: ISO 11783-5 Network Management.

NMEA 2000; Standard for Serial Data Networking of Marine Electronic Devices; Appendix F: ISO 11783-5 DataLink Layer.

NMEA 2000; Standard for Serial Data Networking of Marine Electronic Devices; Appendix G: ISO 11898 Controller Area Network.

Product catalog of i6000TEC—Triple Engine Electronic Shift & throttle of Teleflex Morse Co., Ltd. (USA).

Barron, Jim. "Get on the Bus." Trailer Boats Magazine, Jun. 2000, p. 36.

Spisak, Larry. "Know it by Chart." Boating Magazine, May 2000, p. 100.

J.D. "Gains in technology will alter makeup of the . . . " Boating Industry International, Nov. 2000.

Declaration of Daniel J. Carr.

Denn, James. "Future boats sales will hinge on technology." Boating Industry International, Nov. 2000.

Hemmel, Jeff. "Information, Please—The digital boating revolution begins." Boating Magazine, Sep. 2000.

Kelly, Chris. "Can We Talk?" Power & Motoryacht Magazine, Jun. 2000, pp. 36 & 38, 39.

"Plug and Play" Advertisement from "Motorboating", Dec. 2000, p. 57.

"MagicBus i3000 Series Intelligent Steering" Instruction Manual. Telefex, Inc.

Search Report for PCT/JP 2005/00175, mailed Mar. 1, 2005.

* cited by examiner

INSPECTION SYSTEM FOR WATERCRAFT

PRIORITY INFORMATION

This application is based on and claims priority to Japanese Patent Application No. 2001-290902, filed on Sep. 25, 2001 and is a divisional of U.S. patent application Ser. No. 10/247, 919, filed Sep. 20, 2002, now abandoned the entire contents of which are expressly incorporated by reference herein.

BACKGROUND OF THE INVENTION

1. Field of the Invention

The present invention generally relates to an inspection system for a watercraft, and more particularly relates to an inspection system for a watercraft propelled by an outboard drive (e.g., an outboard motor).

2. Description of Related Art

Many small to medium-sized watercraft, such as pleasure boats and fishing boats, employ outboard drives such as outboard motors. An outboard motor for a watercraft typically incorporates an internal combustion engine placed at the top of the outboard motor structure. The engine is coupled to a propeller or other propulsion device, which is disposed in a submerged position when the watercraft is floating on a body of water. The engine powers the propeller to propel the watercraft.

The engine advantageously includes an engine output control device, such as, for example, a throttle device, which is controlled to change the output (e.g., the speed or the torque) of the engine. For example, in many engines, the throttle device includes a throttle valve located in an air induction system. In such engines, the position of the throttle valve is changed responsive to a control input from an operator to regulate an amount of air delivered by the air induction system to a combustion chamber of the engine. In an engine having another type of output control device, the control input from the operator changes another parameter of the engine to change the output of the engine. For example, the engine output may advantageously be controlled by controlling fuel flow to the engine, by controlling ignition timing of the engine, by controlling valve timing or opening, or by controlling a combination of parameters.

In many typical engines, the propeller is coupled to the engine via a transmission. The transmission incorporates a shifting mechanism to change the coupling of the propeller to the engine to provide forward, reverse and neutral operation of the propeller. For example, for forward motion of the watercraft, the propeller is coupled to the engine such that the propeller rotates in a first direction when the engine is operating. When the shifting mechanism is shifted to reverse to cause backward (i.e., reverse) motion of the watercraft, the propeller is coupled to the engine to rotate in a second direction opposite the first direction. When the shifting mechanism is shifted to a neutral position, the propeller does not rotate although the engine may continue to operate. In addition to the forward, neutral and reverse positions, the shifting mechanism may also include positions that control coupling ratios between the engine and the propeller.

The watercraft is advantageously provided with a control unit disposed remotely in a cockpit of the watercraft so that the watercraft operator may control the throttle device and the changeover mechanism without being positioned proximate to the engine. For example, the control unit has a pair of levers pivotally or slidably mounted with respect to a body of the control unit. When one of the levers (e.g., the engine output control lever) is operated by the operator, the output control device is controlled. For example, in an engine having a throttle valve in an air induction system, the position of the throttle valve is changed to control the air flow and thus to control the engine output. When the other lever (e.g., a shifting control lever) is operated by the operator, the coupling of the propeller to the engine via the transmission is changed via the shifting mechanism to select the rotation direction of the propeller (e.g., forward or reverse) or to select non-rotation of the propeller (e.g., neutral).

Generally, in the watercraft industry, a hull of a watercraft and an outboard drive are produced separately and are combined (i.e., assembled together) by a boat builder during a final production stage of the watercraft or during a earlier stage close to the final production stage. The customer of the watercraft advantageously selects a type of outboard drive and any components, parts or accessories from those which are available on the market. The customer may also order specific components or parts from suppliers. Thus, many combinations of components may be used to rig a watercraft.

After a watercraft is assembled with the selected outboard drive and other components, it is desirable to check whether the outboard drive, components, parts and accessories work together properly. For example, the manufacturer wants to verify that engine output control lever and the shifting control lever in the control unit operate normally and that the engine output control device and the shifting mechanism within the outboard drive properly respond to control movements. Such basic operations affect the fundamental performance of the watercraft (e.g., the maneuverability and the ease of operating a watercraft). In addition, the manufacturer generally wants to assure that the output of the engine (e.g., the engine speed) and the operational mode of the propeller (e.g., forward, neutral and reverse) are properly indicated at respective indicators that are typically located in the cockpit of the watercraft where they can be monitored by the operator.

Conventionally, an inspection of the assembled watercraft with the attached outboard drive and other components is a manual operation that relies on the skills of a human inspector to apply the tests and to observe the responses of the outboard drive and other components (e.g., verifying that the outboard drive responds appropriately to the control devices and that the indicators properly show the status of the outboard drive and other components). Preferably, the inspection tests of the operability of the watercraft and the outboard drive should be done under typical operational conditions (e.g., with the watercraft floating on a body of water). Because of the reliance on human labor to perform the tests and to evaluate the results, such inspections are very costly, time consuming and inefficient, and the results of the inspections may be inaccurate.

SUMMARY OF THE INVENTION

In view of the foregoing, a need exists for an improved inspection system for a watercraft so that operability of a watercraft and an attached outboard drive can be efficiently and accurately checked at a final production stage of the watercraft or at an earlier stage close to the final production stage.

One aspect of the present invention is an inspection system for a watercraft propelled by an outboard drive. A control device controls the outboard drive. The inspection system comprises a first subsystem that provides a control device with a command signal to start an inspection test of the control device. A second subsystem receives a response signal output by the control device. A third subsystem determines whether the response signal from the control device is consistent with a specified signal corresponding to a response generated by a properly operating control device.

Another aspect of the present invention is an inspection system for a watercraft propelled by an outboard drive. The outboard drive includes an engine and a propulsion device powered by the engine. The engine and the propulsion device are controlled by a control device. The control device receives a control signal from a control unit. The control device controls the engine and the propulsion device in response to the control signal. The inspection system comprises a first subsystem that provides the control device with a command signal to start an inspection test on the control device. A second subsystem requests the control device to output a response signal. A third subsystem determines whether the response signal is consistent with a specified signal corresponding to a response generated by a properly operating control device.

A further aspect of the present invention is an inspection system for a watercraft powered by an engine. A control device controls the engine. The inspection system comprises an inspection device that conducts an inspection test of the control device. The inspection device includes a program that comprises a first step that provides the control device with a command signal to start an inspection test on the control device. In a second step, the control device outputs a response signal. A third step determines whether the response signal is consistent with a specified signal corresponding to a response generated by a properly operating control device.

A further aspect of the present invention is an inspection system for a watercraft propelled by an outboard drive. The outboard drive includes an engine and a propulsion device powered by the engine. An operating device provides a control device with a control signal to control the engine and the propulsion device. The inspection system comprises an inspection device that conducts an inspection test of the control device and the operating device. The inspection device includes a program that comprises a first step that provides the control device with a command signal to start an inspection test on the control device. In a second step, the control device outputs a first response signal. A third step determines whether the response signal is consistent with a first specified signal corresponding to a response generated by a properly operating control device. A fourth step provides the operating device with a command signal to start an inspection test on the operating device. In a fifth step, the operating device outputs a second response signal. A sixth step determines whether the second response signal is consistent with a second specified signal corresponding to a response generated by a properly functioning operating device.

A further aspect of the present invention is an inspection system for a watercraft propelled by an outboard drive. The outboard drive includes an engine and a propulsion device powered by the engine. An operating device provides a control device with a control signal to control the engine and the propulsion device. The inspection system comprises an inspection device that conducts an inspection of the operating device. The inspection device includes a program that comprises a first step that provides the operating device with a command signal to start an inspection of the operating device. In a second step, the operating device outputs a response signal. A third step determines whether the response signal is consistent with a specified signal corresponding to a response generated by a properly functioning operating device.

A further aspect of the present invention is an inspection system for a watercraft propelled by an outboard drive. Distinctive part identification codes are assigned to a plurality of components related to the watercraft and the outboard drive. The components are capable of sending readable signals corresponding to the part codes. The inspection system comprises a first subsystem that holds a component table corresponding to the part codes. A second subsystem requests the components to send respective signals to the inspection system. A third subsystem compares the signals sent by the components with the component table.

A further aspect of the present invention is an inspection method for a watercraft propelled by an outboard drive. In accordance with the method, a control device of the outboard drive is provided with a command signal to start an inspection test on the control device. The control device outputs a response signal. The method determines whether the response signal is consistent with a specified signal corresponding to a response generated by a properly operating control device.

A further aspect of the present invention is an inspection method for a watercraft propelled by an outboard drive. The outboard drive includes an engine and a propulsion device powered by the engine. An operating device provides a control device with a control signal to control the engine and the propulsion device. The method provides the control device with a command signal to start an inspection test on the control device. The control device outputs a first response signal. The method determines whether the first response signal is consistent with a first specified signal corresponding to a response generated by a properly operating control device. The method provides the operating device with a command signal to start an inspection test on the operating device. The operating device outputs a second response signal. The method determines whether the second response signal is consistent with a second specified signal corresponding to a response generated by a properly functioning operating device.

In accordance with a still further aspect of the present invention, an inspection method for a watercraft propelled by an outboard drive is provided. The outboard drive includes an engine and a propulsion device powered by the engine. An operating device provides a control device with a control signal to control the engine and the propulsion device. The method comprises providing the operating device with a command signal to start an inspection of the operating device, requesting the operating device to output a response signal, and determining whether the response signal is consistent with a specified signal corresponding to a response generated by a properly operating control device.

A further aspect of the present invention is an inspection method for a watercraft propelled by an outboard drive. Distinctive part identification codes are assigned to a plurality of components related to the watercraft and the outboard drive. The components are capable of sending readable signals corresponding to the part codes. The method includes a component table having entries corresponding to the part codes. The components send respective signals to an inspection system, which compares the signals sent by the components with the entries in the component table.

BRIEF DESCRIPTION OF THE DRAWINGS

The foregoing features and other features, aspects and advantages of the present invention will now be described with reference to the drawings of several preferred embodiments, which are intended to illustrate and not to limit the invention. The drawings comprise eight figures in which.

DETAILED DESCRIPTION OF THE PREFERRED EMBODIMENTS OF THE INVENTION

Figure 1:
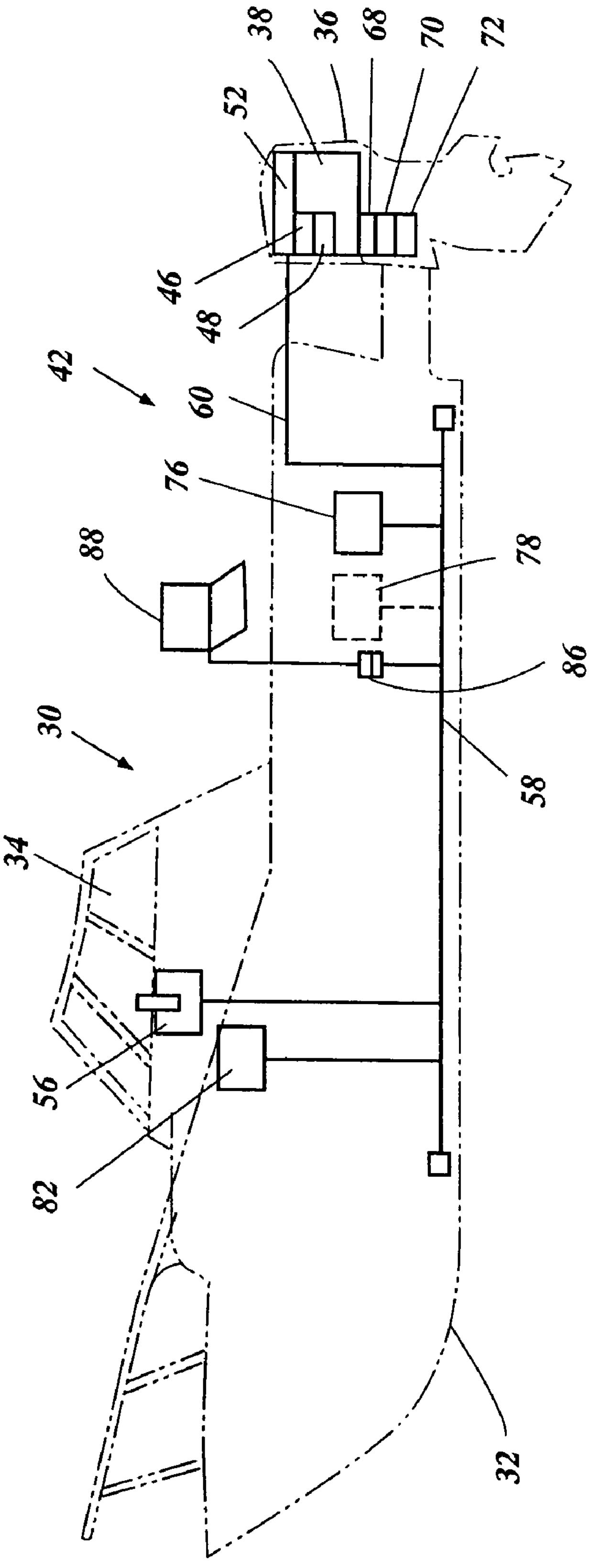
FIG. 1 illustrates a schematic representation of a side elevational view of a watercraft (in phantom) propelled by an outboard motor (in phantom) and provided with an inspection system illustrated as a block diagram and configured in accordance with certain features, aspects and advantages of the present invention.

As schematically illustrated in phantom in FIG. 1, a watercraft 30 comprises a hull 32. A cockpit 34 is defined in a relatively forward area of the hull 32. The illustrated watercraft 30 represents a pleasure boat or a fishing boat, and may also represent other small to medium-sized watercraft.

The watercraft 30 employs an outboard drive (e.g., an outboard motor) 36 (also shown in phantom) that is mounted on a transom of the hull 32 to propel the watercraft 30. The outboard motor 36 incorporates an internal combustion engine 38 mounted at the top of the outboard motor structure and includes a propulsion device (not shown) such as, for example, a propeller or other thrust generating device that is disposed in a submerged position when the watercraft 30 is floating on a body of water. When the engine 38 is operated, power is provided to the propeller or other thrust generating device to cause the watercraft 30 to move over the surface of the water.

Figure 2:
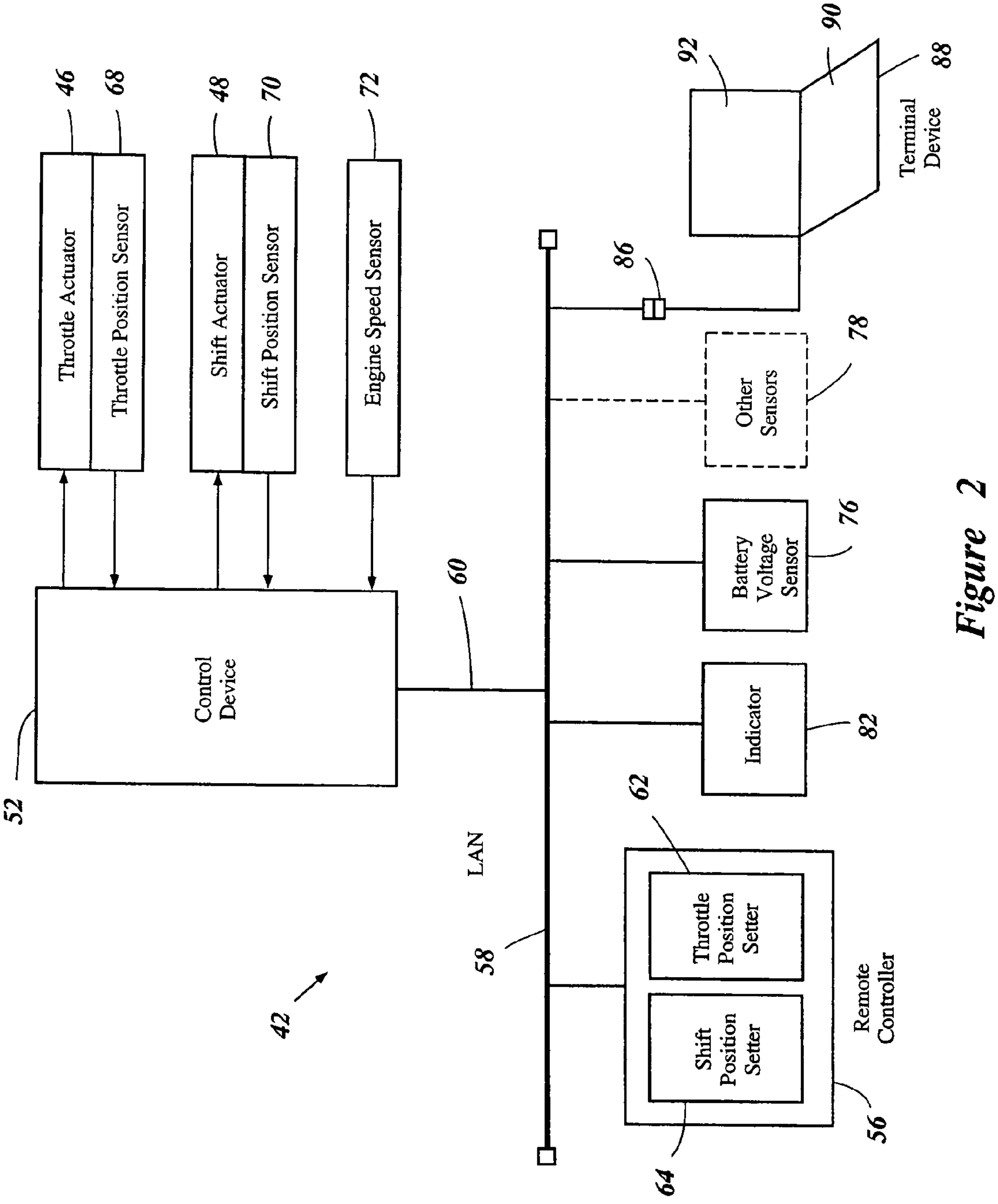
FIG. 2 illustrates a block diagram of an embodiment of the inspection system of FIG. 1.

As shown in the block diagrams of FIGS. 1 and 2, the watercraft 30 and the outboard motor 36 together employ an inspection system 42 to check or inspect the watercraft 30 in combination with the outboard motor 36. The inspection system 42 has a particular utility in the context of a combination of a pleasure boat or a fishing boat with an outboard motor and is described in the context of the combination. However, one skilled in the art will understand that the inspection system 42 can also be used with other types of watercrafts and outboard drives wherein at least one outboard drive is separately produced and then combined with the associated watercraft. Other examples will become apparent to those of ordinary skill in the art.

The engine 38 comprises an air induction system that delivers air to one or more combustion chambers of the engine. The engine 38 additionally comprises a charge forming system such as a fuel injection system or a carburetor system in association with the air induction system to form air/fuel charges in the combustion chambers. When the air/fuel charges are ignited in the combustion chambers, power is generated. In the illustrated system, the combustion causes reciprocal movement of pistons in the combustion chambers. The reciprocal movement is translated to rotational movement of a crankshaft. The crankshaft rotation is coupled via gears and shafts or other linkages to a the propeller or other thrust generating device. An exhaust system (not shown) routes exhaust byproducts from the combustion chambers to the external environment.

In the illustrated embodiment, the air induction system incorporates a throttle valve assembly comprising one or more throttle valves (not shown) to regulate or measure a quantity of air provided to the combustion chambers during each induction cycle. Each throttle valve can be a butterfly type valve and can be disposed within an intake passage for pivotal movement therein. The throttle valve has an operating state or characteristic corresponding to its position relative to the intake passage or the plenum chamber. When the state (e.g., position) of the throttle valve is changed, a degree of opening of an airflow path of the intake passage changes, and the quantity of air allowed to pass through the passage or plenum chamber is regulated. In the illustrated embodiment, the regulation of the quantity of air regulates the output (e.g., the speed) of the engine 38. The throttle valve assembly thus forms an adjustment mechanism that changes the engine speed in this arrangement. Normally and unless the environmental circumstances changes, when the degree to which the throttle valve is opened increases, the rate of airflow increases and the engine speed increases. A slidably movable throttle valve can replace the butterfly type throttle valve. One skilled in the art will also appreciate that the engine control system 42 described herein can also be used with adjustment mechanisms other than throttle valves. For example, the engine control system 42 can be used with adjustment mechanisms that change operating states to regulate fuel flow (e.g., vary fuel injection timing, duration, amount, fuel pressure, etc.), with adjustment mechanisms that change operating states to regulate ignition timing, and with adjustment mechanisms that change operating states to regulate cylinder valve movement (e.g., vary intake or exhaust valve timing, duration and/or lift).

The throttle device preferably is provided with a throttle actuator 46 such as, for example, an electric motor. The electric motor preferably is coupled with a throttle valve shaft or a shaft related to the throttle valve. The electric motor rotates in response to a control signal to actuate the throttle device.

The output of the engine 38 is transferred to the propeller or other propulsion device through a transmission disposed in a lower housing of the outboard motor 36. The transmission has a transmission shifting mechanism that controls the coupling of the propeller to the engine (e.g., controls the mode of operation of the propeller). In particular, the shifting mechanism can be moved to a forward position to couple the propeller to the engine in a first mode of operation, which causes the propeller to rotate in a first direction to propel the watercraft in a forward direction. The shifting mechanism can be moved to a reverse position to couple the propeller to the engine in a second mode of operation, which causes the propeller to rotate in a second direction opposite the first direction to propel the watercraft backward. The shifting mechanism can be operated to a neutral position to decouple the propeller from the engine so that the propeller is in a third mode of operation in which the propeller does not rotate in response to the engine and thus does apply thrust to the watercraft. In the following description, the term "shift position" refers to the mode of operation of the propeller (e.g., forward, neutral or reverse) or refers to the position of the shifting mechanism that corresponds to the mode of operation of the propeller.

The changeover mechanism preferably is provided with a shift actuator 48 such as, for example, an electric motor or a solenoid coupled with a shift rod or other members of the changeover mechanism. The motor or solenoid moves in response to a control signal to actuate the changeover mechanism.

The outboard motor 36 incorporates a control device 52 that controls the throttle actuator 46 and the shift actuator 48. The control device 52 preferably comprises a microprocessor or central processing unit (CPU), a memory or other data storage device, and an interface that couples the memory with the CPU.

The watercraft 30 includes a control unit or other operating device 56 that is preferably disposed in the cockpit 34 at a remote location from the outboard motor 36 so that the operator does not have to be close to the outboard motor 36 when operating the watercraft 30. The control unit 54 and the control device 52 are preferably coupled to each other via a local area net work (LAN) 58 and an electrical cable 60. In preferred embodiments, the LAN 58 is advantageously positioned on the bottom portion of the hull 32 along a keel that extends from the bow to the stern of the hull 32.

The control unit 56 preferably includes a pair of levers (not shown) that are pivotally or slidably mounted onto a body of the control unit 56. One of the levers is a throttle lever related to a throttle position setter 62, and the other lever is a shift lever related to a shift position setter 64. The throttle and shift levers are positioned adjacent to each other such that the operator can operate both of the levers with one hand.

When the throttle lever is operated, the throttle position setter 62 generates an initial throttle position control signal. When the shift lever is operated, the shift position setter 64 generates an initial shift position control signal. For example, in the preferred embodiment described herein, an amount of the physical movement of either the throttle lever or the shift lever, i.e., a change in an angular position or a slide position from a respective original position, is converted to a signal that has a voltage or other electrical value that represents an amount of movement or a position of the respective lever.

The signals generated by the control unit 56 are communicated to the control device 52 via the LAN 58 and the electrical cable 60. In alternative embodiments, the control device 52 can receive the initial control signals and send the initial control signals to the throttle actuator 46 and the shift actuator 48 without changing the signals. However, in the preferred embodiment illustrated herein, the control device 52 changes the initial control signals in accordance with environmental conditions into modified control signals and then controls the throttle actuator 46 and the shift actuator 48 using the modified control signals. In order to change the initial control signals into the modified control signals, the CPU of the control device 52 communicates with the memory through the interface. The memory preferably stores a control map that contains control amounts versus engine loads and throttle positions. The CPU selects uses the engine load and the throttle position to select one of the control amounts most suitable to the engine load and the throttle position under the circumstances.

Preferably, the watercraft 30 and the outboard motor 36 include a throttle position sensor 68, a shift position sensor 70 and an engine speed sensor 72 that are positioned at proper locations to send a throttle position signal, a shift position signal (e.g., a propeller mode of operation signal) and an engine speed signal, respectively, to the CPU of the control device 52. Each signal has a characteristic voltage or other electrical value that represents the respective parameter sensed by the respective sensor.

The throttle position sensor 68 detects an actual position or opening degree of the throttle valves (or the corresponding parameter of an alternative engine control device). In the illustrated embodiment, the throttle position sensor 68 is preferably disposed on a valve shaft or on a shaft connected to the valve shaft.

The shift position sensor 70 detects an actual position of the transmission shifting mechanism. That is, the shift position sensor 70 senses whether the propeller is coupled to the engine 38 for the forward mode of operation, coupled to the engine 38 for the reverse mode of operation, or decoupled from the engine 38 for the neutral mode of operation. For example, the shift position sensor 70 can advantageously be positioned adjacent to the shift rod that controls the mode of operation (e.g., the shift position) of the propeller.

In the illustrated preferred embodiment, the engine speed sensor 72 preferably comprises a crankshaft angle position sensor that is positioned proximate a crankshaft of the engine 38. The angle position sensor measures a crankshaft angle versus time and outputs a crankshaft rotational speed signal or engine speed signal.

The CPU of the control device 52 receives the throttle position signal and the engine speed signal and uses the two signals to determine the engine load. The CPU uses the engine load to make decisions for controlling the outboard motor 36 and particularly for controlling the engine 38.

An exemplary control system is disclosed in, for example, in a co-pending U.S. application, titled *Engine Control System for Watercraft*, and identified as Attorney Docket No. FS.20063US0A. The entire contents of the co-pending application are expressly incorporated by reference herein.

In the illustrated embodiment, the watercraft 30 and outboard motor 36 include a battery voltage sensor 76 and other sensors 78. For example, the other sensors 78 advantageously include a lubricant oil amount sensor and a fuel amount sensor. The battery voltage sensor 76 and the other sensors 78 generate output signals that are sent to the control device 52 via the LAN 58 and the electrical cable 60. The CPU in the control device 52 receives the signals and uses the signals to in making decisions for controlling of the outboard motor 36.

In the illustrated embodiment, the watercraft 30 includes a digital or analog indicator (or meter) 82, which is positioned in the cockpit 34 to indicate the throttle position, the shift position, the engine speed, the battery voltage and other necessary information. The indicator 82 is coupled to the control device 52 via the LAN 58 and the electric cable 60. Preferably, the indicator 82 is positioned so that the indicator can be easily monitored by the operator while the operator is controlling the watercraft 30 and the outboard motor 36. By monitoring the indicator 82, the operator can recognize the operating conditions of the outboard motor 36. In particularly preferred embodiments, the output signals of the sensors 76, 78 also are sent to the indicator 82 through the LAN 58 to be used for indicating normal or abnormal conditions of the associated devices or units. Otherwise, the signals can be sent to a sounder such as, for example, a buzzer to warn the abnormal conditions. One skilled in the art will recognize that the indicator 82 may be implemented in multiple ways, such as, for example, multiple meters or other indicators so that each position signal and other signals are always indicated, one or more meters or other indicators that are switched between signals, or a indicator panel that shows multiple signal indications on the same panel.

The watercraft 30 is provided with other mechanical and electric cables and conduits to communicate with the outboard motor 36. Those cables and conduits are not shown in FIGS. 1 and 2. For example, the mechanical cables can include a steering cable and a transmission control cable. The electric cables can include a battery cable. The conduits can include a fuel delivery conduit. These cables and conduits are well known to those skilled in the art and are not described in detail herein.

The LAN 58 advantageously includes a connector 86 that provides communication access to the LAN 58. A terminal device or inspection device 88 such as, for example, a personal computer, can be connected to the LAN 58 through the connector 86. Although the illustration in FIG. 1 schematically shows the connector 86 located away from the cockpit 34, in preferred embodiments, the connector 86 is located in the cockpit 34 so that a person conducting inspection tests (e.g., an inspector) can monitor the indicator 82 while operating the terminal device 88. As shown in FIG. 2, the terminal device 88 preferably comprises a notebook computer that has a keyboard 90 and an indicator panel or indicating unit 92. The terminal device 88 can advantageously be connected to a printer or other external indicating unit by wire, by radio communication, by infrared signals or by other known communications systems.

As discussed above, the control device 52, the control unit 56, the terminal device 88, the sensors 76, 78, and the indicator 82 are coupled with each other via the LAN 58. The devices can advantageously communicate with each other using conventional protocols. Thus, the inspection system 42 can be easily configured and set up to work with conventional components that are available on the market.

Figure 3:
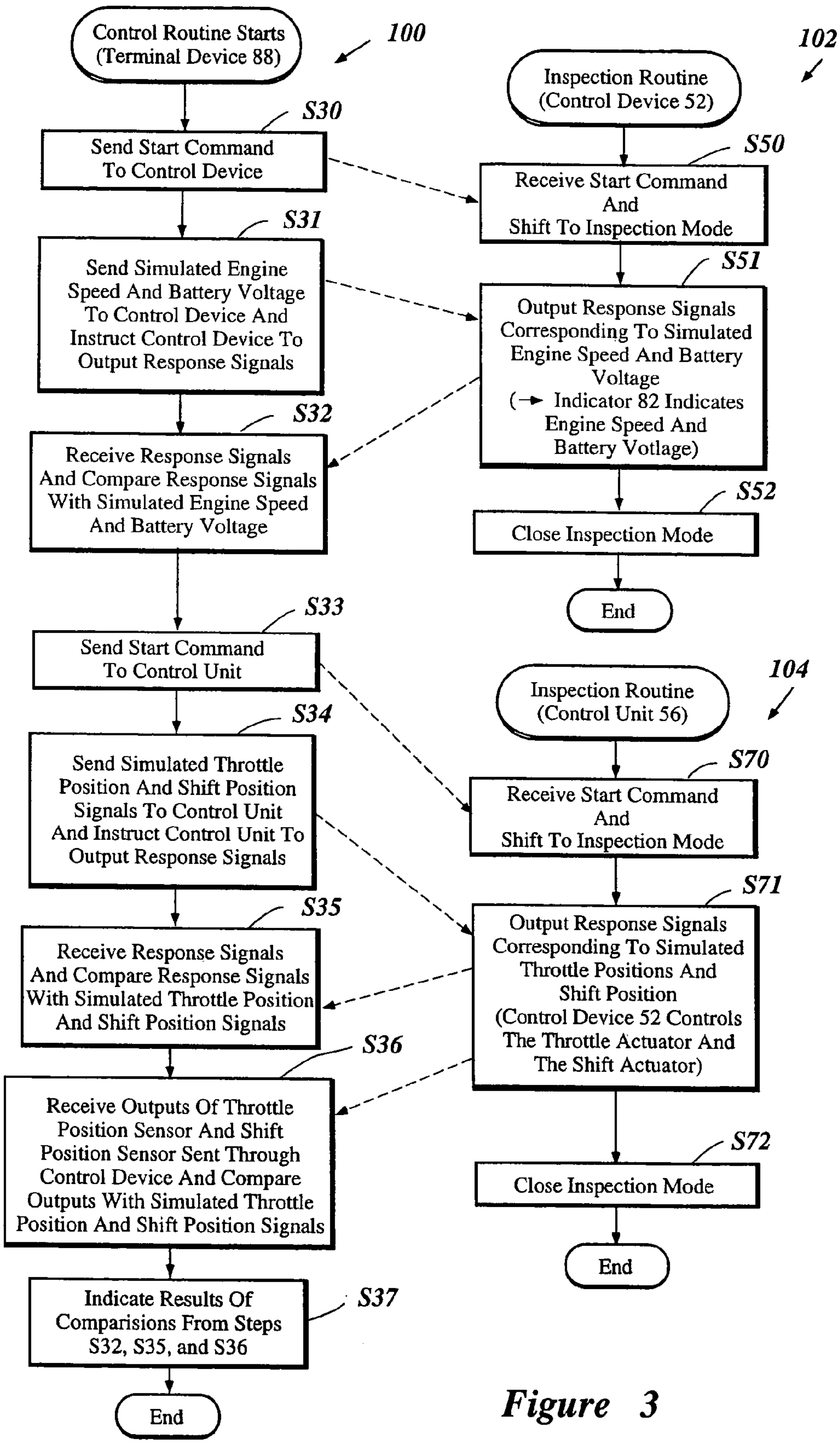
FIG. 3 illustrates a flow chart of an embodiment of the operation of the inspection system of FIGS. 1 and 2, the flow chart including one control routine and two inspection routines.

An exemplary preferred system (e.g., procedure) for inspection of the watercraft 30 with the outboard motor 36 is illustrated in FIG. 3 and is described below. The procedure is implemented as a program stored in the terminal device 88. The program implements a set of inspection procedures that determine whether the control device 52 and the control unit 56 are working and communicating properly. Preferably, the program is previously installed in the terminal device 88. In one embodiment, the control device 52 is commanded to shift to an inspection mode first and then the control unit 56 is commanded to shift to an inspection mode. The order in which the two devices shift to their respective inspection modes can be changed. In certain circumstances, the inspection mode of the control device 52 or the inspection mode of the control unit 56 can be omitted so that only one of the two devices is in the respective inspection mode.

As illustrated in FIG. 3, the inspection procedure comprises a first routine or subsystem 100, a second routine or subsystem 102 and a third routine or subsystem 104. The first routine 100 corresponds to a control routine conducted by the terminal device 88. The second routine 102 and the third routine 104 respectively relate to inspection routines conducted by the control device 52 and the control unit 56. The solid arrows between the blocks in FIG. 3 indicate transfers from one step to another step in the same routine. The phantom arrows between the blocks in FIG. 3 indicate cues generated by one routine that start a step in another routine.

When conducting the inspection procedure illustrated in FIG. 3, the inspector turns on the terminal device 88 and also turns on a main switch in the watercraft 30 connected to the control device 52 and the control unit 56. Of course, the control device 52 and the control unit 56 can be turned on in a different manner. The engine 38 does not need to be operating in the illustrated inspection procedure.

The control routine starts and proceeds to a step S30 to conduct the inspection of the control device 52 with the inspection routine 102. In particular, at the step S30, the terminal device 88 provides the control device 52 with a command signal (e.g., a start signal) that indicates the start of the inspection routine on the control device 52. The control routine then proceeds to the step S31. The inspection routine 102 is initialized and then proceeds to a step S50 where the control device 52 waits for receipt of the start signal. The control device 52 enters the inspection mode in response to the start signal, and the inspection routine 102 proceeds to a step S51.

At the step S31 of the control routine 100, the terminal device 88 sends specified signals to the control device 52. The specified signals command (e.g., request) the control device 52 to output response signals. The specified signals can be generated together or generated sequentially (i.e., one by one). The control routine 100 then proceeds to a step S32. In the illustrated program, exemplary specified signals include a signal indicative of a simulated engine speed and a signal indicative of a simulated battery voltage. The exemplary specified signals are provided as inputs to the control routine 100 by the inspector via the keyboard of the terminal device 88.

At the step S51, the control device 52 outputs a signal indicative of the engine speed and the battery sensor signal to the terminal device 88 as the response signals in accordance with the instructions from the terminal device 88.

The illustrated control device 52 usually does not monitor the battery voltage from the battery voltage sensor 76 or monitor other outputs from the other sensors 78. However, the control device 52 can generate a representation of at least the battery voltage sensor 76 in the particular inspection mode. The control device 52 sends the representation as a response signal of the sensor 76. Alternatively, the battery voltage sensor 76 and the other sensors 78 can include an inspection mode in which the sensors 76, 78 generate response signals.

In the illustrated program, the control device 52 also outputs the response signals to the indicator 82 at the step S51. The indicator 82 thus indicates the simulated engine speed and the simulated battery voltage corresponding to the response signals. The inspector thus can recognize whether the indicator 82 works properly. For example, if the respective indication of engine speed or battery voltage on the indicator 82 differs from the specified engine speed or from the specified battery voltage but the terminal device 88 determines the control device 52 is working properly, then the inspector can determine that the indicator 82 is not working properly.

After completing the step S51, the routine 102 proceeds to the step S52 and closes the inspection mode of the control device 52.

At the step S32, the terminal device 88 compares the response signals from the control device 52 with the specified signals (e.g., the signals expected to be generated by the control device 52) and determines whether the response signals are consistent with the original signals.

The control routine 100 then proceeds to a step S33 to activate the inspection routine 104 to conduct the inspection on the control unit 56. At the step S33, the terminal device 88 provides the control unit 56 with a command signal (e.g., a start signal) that indicates the start of the inspection of the control unit 56. The control routine 100 then proceeds to a step S34. The inspection routine 104 is initialized and then proceeds to a step S70 where the control unit 56 waits for receipt of the start signal. The control unit 56 enters the inspection mode in response to the start signal, and the inspection routine 104 proceeds to a step S71.

At the step S34, the terminal device 88 sends specified signals to the control unit 56 that command or request the control unit 56 to output response signals. The specified signals can be generated together or can be generated sequentially (i.e., one by one). The control routine 100 then proceeds to a step S35. In the illustrated program, exemplary specified signals advantageously include a simulated initial throttle position control signal and a simulated initial shift position control signal. The exemplary specified signals are provided as inputs to the control routine 100 by the inspector via the keyboard of the terminal device 88.

At the step S71, the control unit 56 outputs the throttle position control signal and the shift position control signal as the response signals in accordance with the instruction by the terminal device 88. In the illustrated program, the control unit 56 also outputs the response signals to the control device 52 as the initial control signals at the step S71. The control device 52 actually controls the throttle actuator 46 and the shift actuator 48 in accordance with the signals from the control unit 56. Thus, the throttle device and the changeover mechanism are actuated. The throttle position sensor 68 and the shift position sensor 70 detect the throttle position and the shift position, respectively, and output the detected signals to the terminal device 88. At the step S71, the indicator 82 can additionally indicate the simulated throttle position and the simulated shift position to enable the inspector to double check the indicator 82. After completing the step S71, the inspection routine 104 proceeds to a step S72 and closes the inspection mode of the control unit 56.

At the step S35, the terminal device 88 compares the response signals from the control unit 56 with the specified signals and determines whether the response signals are consistent with the specified signals. The control routine 100 then proceeds to a step S36.

At the step S36, the terminal device 88 compares the throttle position and shift position signals which are actually detected with the specified signals and determines whether the actually detected signals are consistent with the specified signals. The control routine 100 then proceeds to a step S37.

At the step S37, the indicator panel 92 of the terminal device 88 displays the determinations of the inspection routine generated at the step S32, the step S35 and the step S36. Simultaneously or alternatively, the terminal device 88 can advantageously instruct the printer to print out the determinations, instruct the external indicating unit to show the determinations, or instruct both the printer and the external indicating unit.

Alternatively, the determination at the step S32 can be indicated or printed out immediately after the step S32 without waiting for the determinations generated at the step S35 and the step S36.

After completing the step S37, the control routine 100 ends all the inspection routines.

By conducting the inspection program, the inspector can, for example, check whether the control device 52 works properly, whether the control unit 56 works properly, whether the indicator 82 works properly, whether the combination of the control device 52 in the outboard 36 and the control unit 56 in the watercraft 30 is an appropriate combination, and whether the LAN and the electric cables are properly coupled with each other. If the inspector finds something wrong or abnormal, the inspector can fix any wrong or abnormal portion or ask another person to do to perform any necessary corrective action.

As described above, the inspection of the watercraft with the outboard motor can be conducted automatically and without the watercraft being placed on a body of water and without the engine operating. Thus, the check of the watercraft is quite efficient and can be easily performed at the final production stage of the watercraft or at an earlier production stage close to the final production stage.

Figure 4:
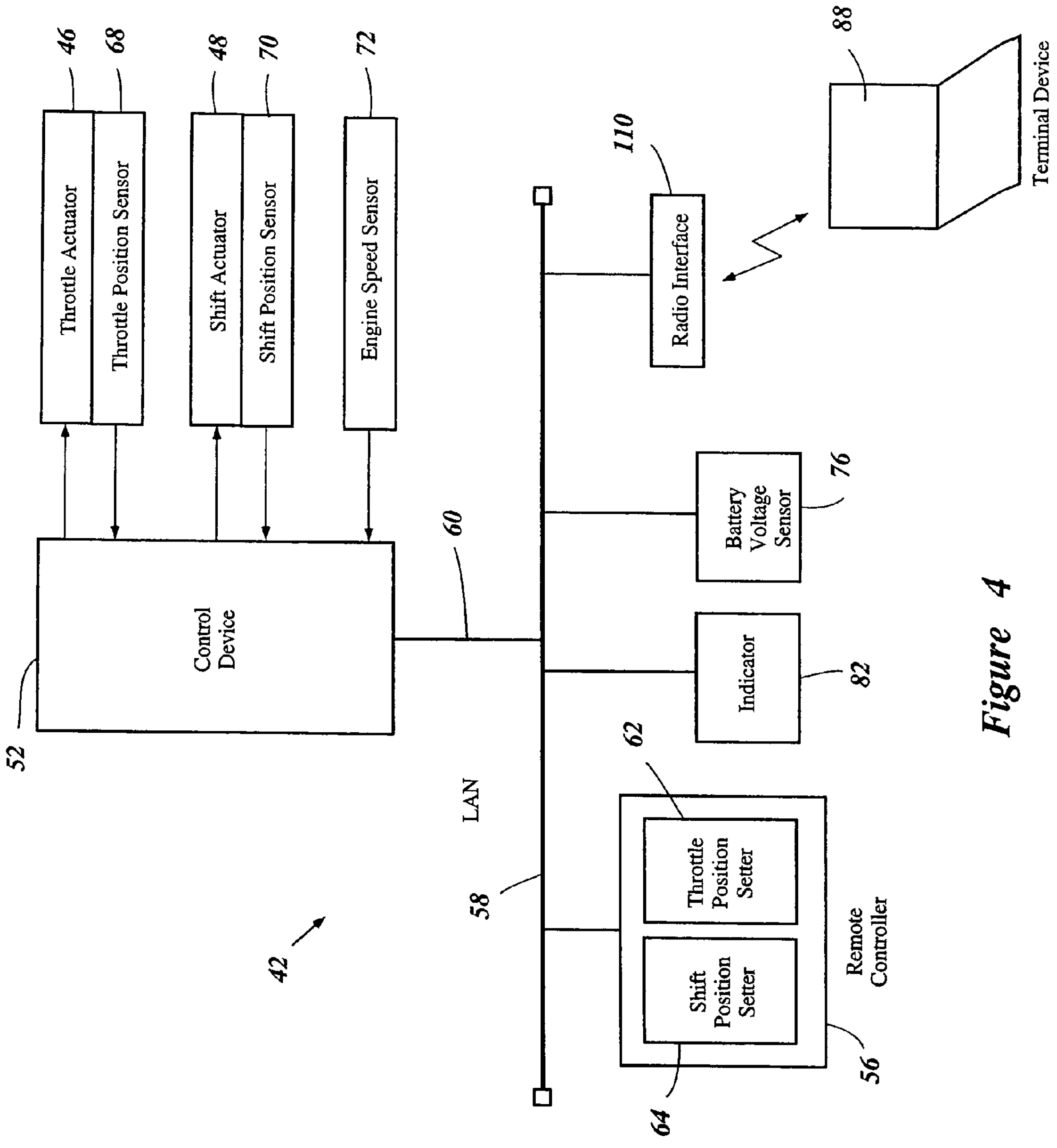
FIG. 4 illustrates a block diagram of an alternative embodiment of the inspection system of FIG. 1.

As an alternative to coupling the terminal device 88 to the LAN 58 via the connector 86, the terminal device 88 can be coupled to the LAN 58 via a radio interface 110 as illustrated in FIG. 4. Advantageously, the radio interface 110 can be selected from any interface that operates at radio frequencies. For example, an exemplary commercially available radio interface used in the illustrated alternative system is configured in accordance with the Bluetooth™ wireless technology as defined in the Bluetooth Wireless Specification promulgated by Bluetooth SIG, Inc. Because the terminal device 88 is not mechanically connected to any other part of the inspection system 42 in this alternative, the inspector can position the terminal device 88 at any place or move the terminal device 88 as the inspection is being performed.

Figure 5:
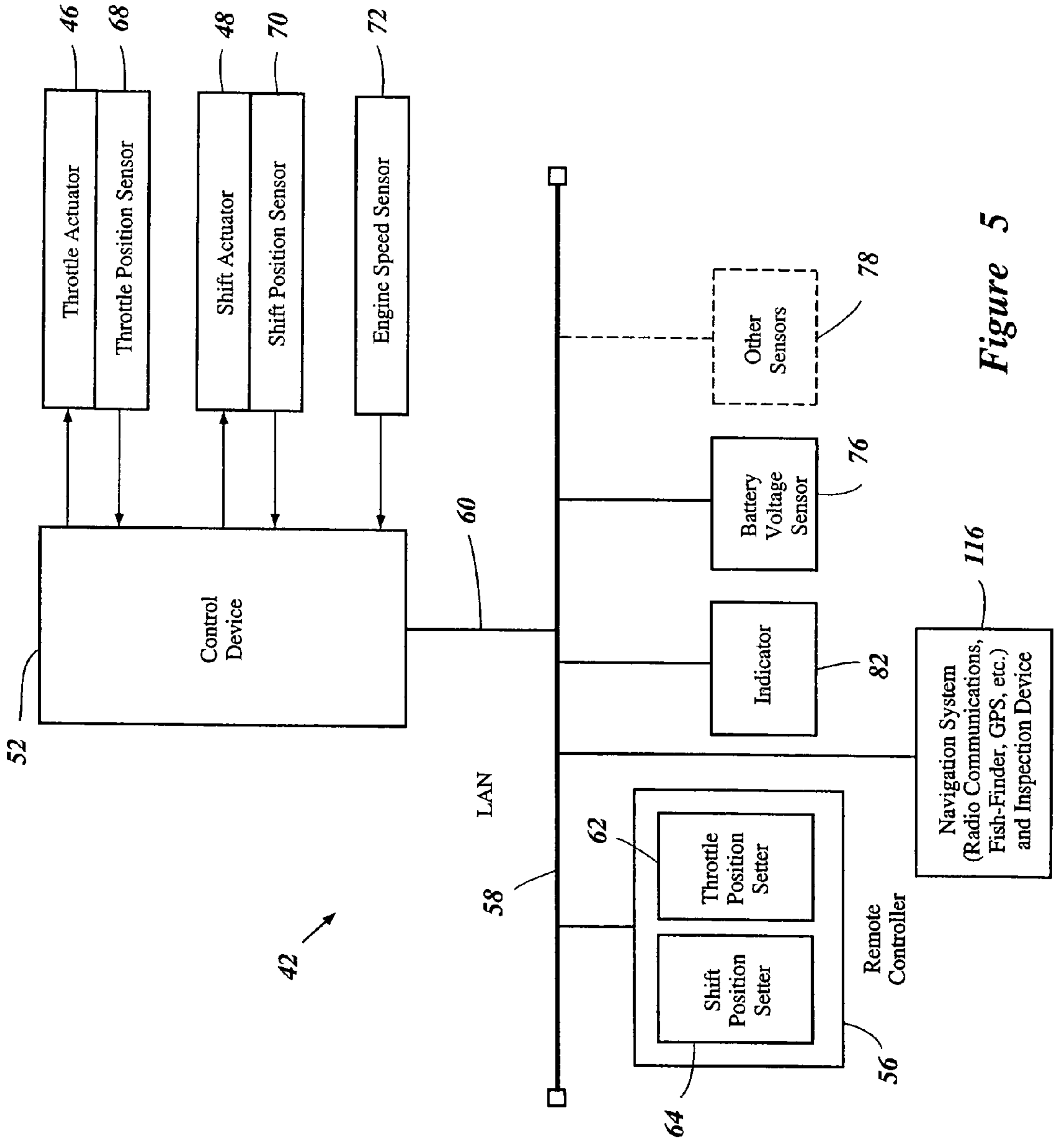
FIG. 5 illustrates a block diagram of a further alternative embodiment of the inspection system of FIG. 1.

Various electronic devices and units having a microprocessor (or CPU) and a memory (or storage) can be used as the terminal device 88 other than the laptop type computer. For example, FIG. 5 illustrates a further alternative using a navigation unit 116 as an inspection device. The navigation unit 116 advantageously includes radio communications equipment, a fish-finder, a global positioning system (GPS) unit, and other components. As such, the navigation unit 116 includes hardware such as a microprocessor and a memory. The foregoing inspection program or other inspection programs provided in accordance with the present invention can be installed in the memory of the navigation unit 116 to conduct the inspection of the watercraft with the outboard motor. The inspection programs can be uninstalled after the inspection has been finished. Otherwise, the programs can be held in those devices or units for maintenance, i.e., for reconducting the inspection later.

Figure 6:
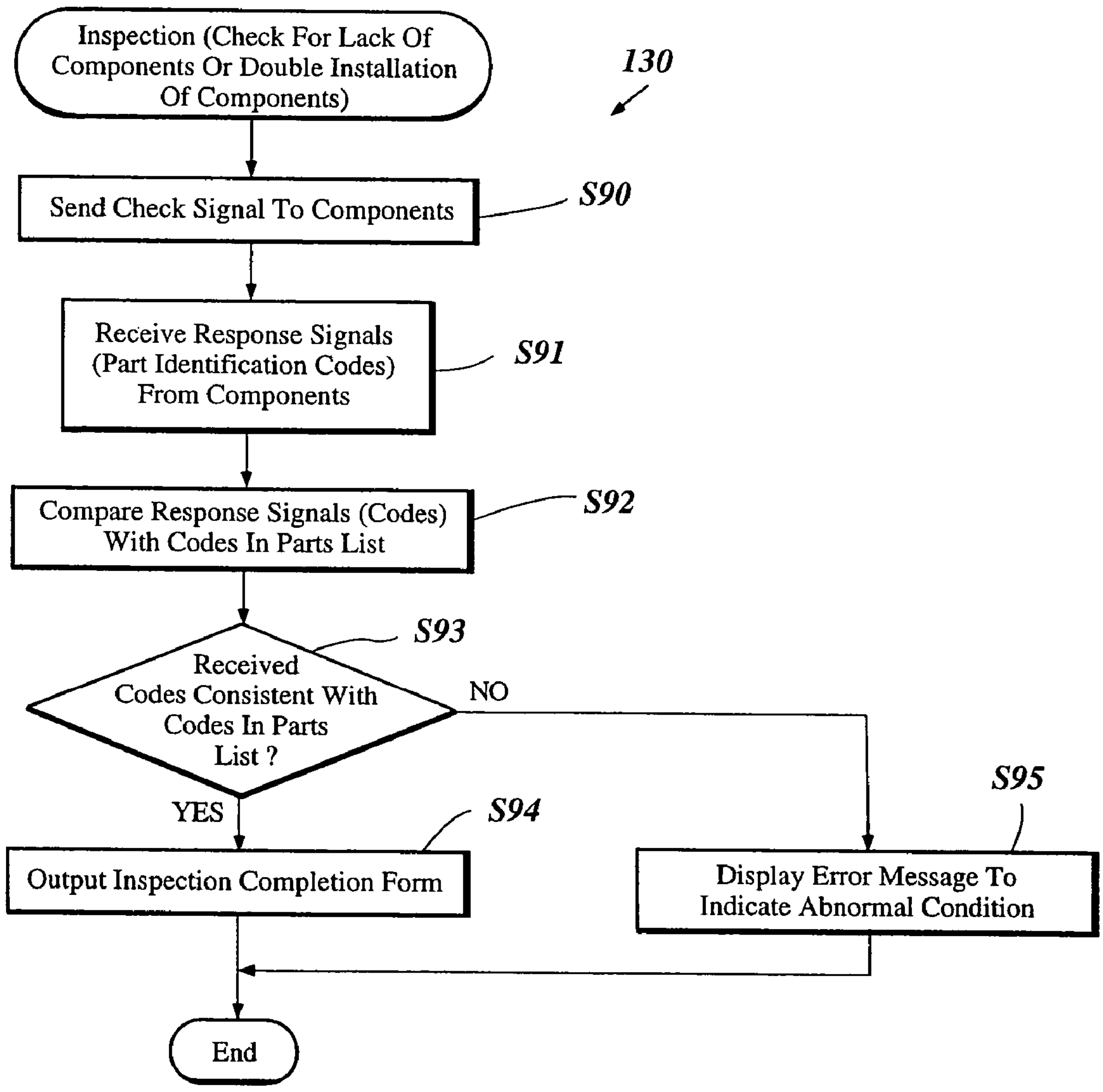
FIG. 6 illustrates a flow chart of an embodiment of an operation of an inspection routine for another type of inspection using the inspection system of either FIG. 1, FIG. 4 or FIG. 5.

FIG. 6 illustrates an inspection routine 130 that may be performed using the inspection system 42 shown in either FIG. 1, FIG. 2, FIG. 4 or FIG. 5 to conduct a second inspection of the combination of the watercraft 30 and the outboard motor 36.

In the second inspection, a lack of components or a double installation of a component can be checked. In order to conduct the second inspection, all the components related to the watercraft 30 and the outboard motor 36 are assigned with distinctive part identification codes. The part codes that can be used for the inspection include magnetized codes, bar codes, other magnetic or optical codes, electronically readable codes and other physically recognizable codes. The terminal device 88 previously stores a component table that includes the same part codes as those assigned to the respective components. The component table comprises a list of all components of the watercraft 30 and the outboard motor 36 as set forth in the specifications for the watercraft 30 and the outboard motor 36.

The inspection routine 130 starts and proceeds to a step S90. The terminal device 88 utilizes the LAN 58 to provide all the components with a check signal to request the components to send respective response signals to the terminal device 88. In this second inspection, the response signals are the readable part codes for each component. The routine 130 then proceeds to a step S91 wherein the terminal device 88 receives the response signals from the components. The routine 130 then proceeds to a step S92.

At the step S92, the terminal device 88 compares the received response signals with the part codes stored in the component table. The routine 130 then proceeds to a step S93 to determine whether all the received response signals are consistent with the part codes stored in the component table. If, at the step S93, the terminal device 88 determines that all the response signals are consistent with the component table, the routine 130 proceeds to a step S94. Otherwise, the routine 130 proceeds to a step S95.

At the step S94, the terminal device 88 outputs a inspection completion form, which is previously stored in the terminal device 88. The inspection completion form can be printed out or sent to another device connected to the terminal device 88 by wire or by a radio communication system so that a person other than the inspector can review or use the form later or at a remote location.

At the step S95, the terminal device 88 indicates that one or more components are abnormal (e.g., a wrong part is installed or a part has been incorrectly installed multiple times). Alternatively or in addition, the terminal 88 outputs a signal that indicates an abnormal condition of the components to another device. The indication of an abnormal condition can also be sent to a printer to be printed out. The inspector can fix the abnormal condition or the inspector can ask someone else to fix the abnormal condition.

After completing the step S94 or after completing the step S95, the inspection routine 130 ends.

All the components of the watercraft and the outboard motor do not necessarily have the readable part identification codes. For example, only important components selected in accordance with a certain criterion may have the part codes in particular embodiments.

Figure 7:
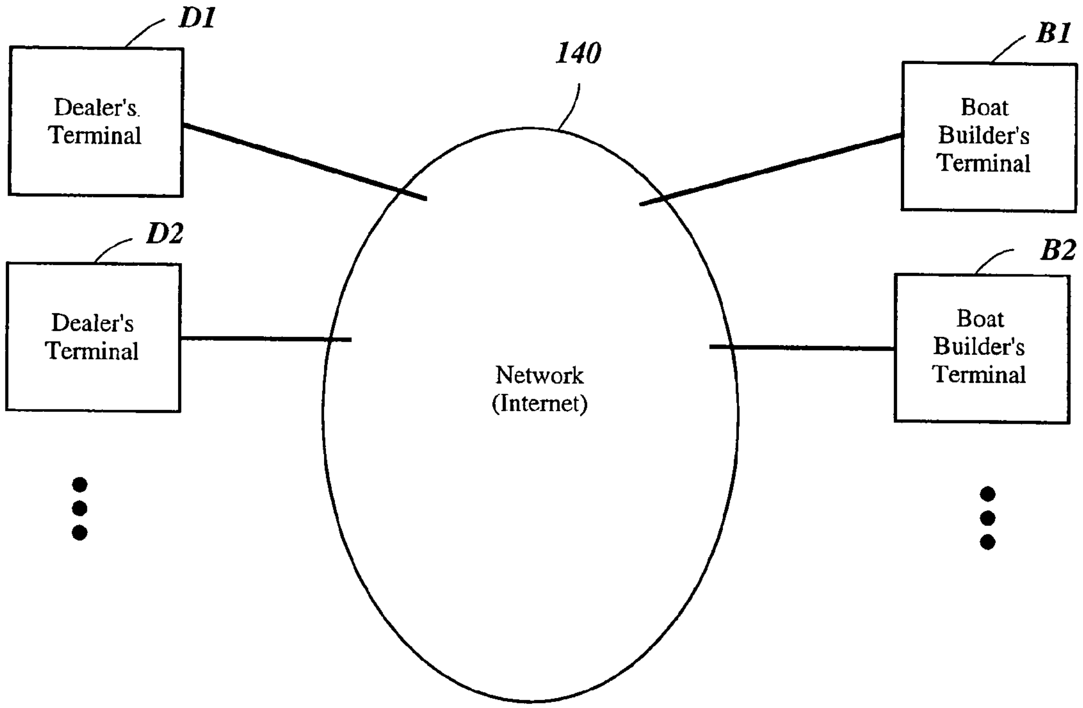
FIG. 7 illustrates a diagrammatic view of an exemplary network that includes terminal units of dealers and terminal units of boat builders and that is suitable for with the embodiment of the inspection routine of FIG. 6.
Figure 8:
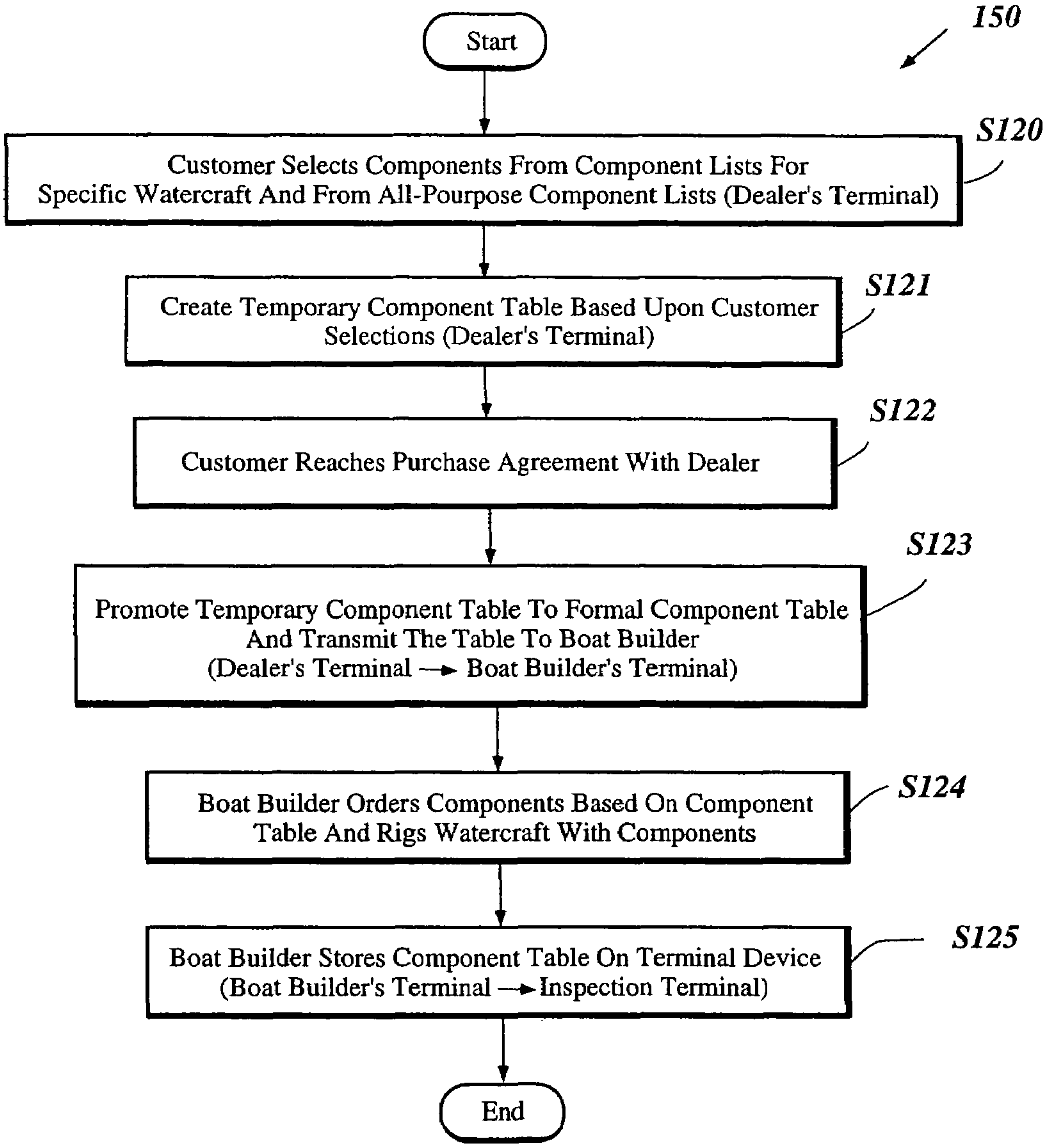
FIG. 8 illustrates a flow chart that shows the creation of a component table and that shows the use of the component table with the network of FIG. 7.

FIGS. 7 and 8 illustrate a suitable way to create the component table in the terminal device 88 and to store the component table in the terminal device 88.

FIG. 7 illustrates an exemplary network 140 that interconnects the dealer terminal units D1 and D2 and the boat builder terminal units B1 B2. Although only two terminal units for dealers and two terminal units for boat builders are shown, it should be understood that additional terminal units for dealers and additional terminal units for boat builders can advantageously be coupled to the network 140. The network 140 can advantageously be the Internet or another public or private network. The Internet is advantageously used to provide worldwide interconnections between dealers and boat builders.

A customer associated with one of the dealers selects necessary and desired components at the terminal unit D1, for example, and sends information about the components to one of the boat builders associated with the dealer through the network 140. The boat builder obtains the information at the terminal unit B1, for example, and rigs the watercraft purchased by the customer with the selected components. The boat builder stores a specific component table in a terminal device (or check-conducting device) which will be used for the second inspection. The component table lists the components of the completed watercraft as assembled by the boat builder.

A flowchart in FIG. 8 illustrates an exemplary routine 150 for making the component table and for handling the component table through the network 140. In the following description, the dealer's terminal unit D1 and the boat builder's terminal unit B1 are terminal units that are used to perform the steps in the flow chart 50.

The routine 150 starts and proceeds to a step S120. At the step S120, the customer for a specific watercraft selects the necessary components, the desired components or combinations of necessary components and desired components from existing component lists that contain all components that can be specifically used for the specific watercraft and from all-purpose component lists that contain components that can be used for all watercraft or for a watercraft group that includes the specific watercraft. The selection is made at the terminal unit D1. The component lists are stored in the terminal unit D1 or in the terminal unit B1. Alternatively, the network 140 can include another unit (e.g., a server) that stores the component lists, and the customer can access the component lists via the network 140. All the listed components have previously been assigned with the distinctive part identification codes discussed above.

The routine 150 then proceeds to a step S121 wherein the terminal unit D1 creates a temporary component table based upon the selections of the customer. The temporary component table is suspended (e.g., stored but not yet transmitted) in the terminal unit D1 until the customer and the dealer complete a purchase agreement (e.g., a purchase contract).

The routine 150 then proceeds to a step S122 wherein the customer and the dealer endeavor to complete a purchase agreement. If the purchase agreement is completed, the routine 150 proceeds to a step S123. On the other hand, if the purchase agreement is not completed, the routine 150 does not proceed to the step S123, and the routine ends.

At the step S123, the terminal unit D1 promotes the temporary component table to a formal component table and releases (e.g., communicates) the formal component table to the terminal unit B1 of the boat builder via the network 140 to request the boat builder to initiate the assembly of the watercraft, the outboard motor and the selected components by the boat builder.

The routine 150 then proceeds to a step S124 wherein the boat builder orders the components from internal divisions or sections or from suppliers based upon the information in the formal component table. When the watercraft, the outboard motor and the selected components are available, the boat builder rigs (i.e., assembles) the watercraft with the outboard motor and the components.

The routine 150 proceeds to a step S125 wherein the boat builder transfers the information in the component table to the terminal device that will be used to check the completed watercraft in accordance with the second inspection described above. The second inspection is conducted in accordance with the inspection program 130 described above in connection with FIG. 6. After completing the step S125, the routine 150 ends.

By using the illustrated network system 140 and the routine 150, the component table can be prepared before the second inspection is conducted. The component table accurately includes the components that the customer has selected because the component table is created by the boat builder to completely reflect the selected components via the distinctive part identification codes corresponding to the components. Furthermore, since the boat builder orders components using the component table provided by the dealer and therefore does not need to create the table, the boat builder is less likely to experience errors in ordering components for the assembled watercraft.

The foregoing description describes preferred embodiments of inspection systems and methods having certain features, aspects and advantages in accordance with the present invention. Various changes and modifications may be made to the above-described inspection systems and methods without departing from the spirit and scope of the invention, as defined by the following claims.

What is claimed is:

1. An inspection system for a watercraft propelled by an outboard drive and having a plurality of components related to the watercraft and the outboard drive identified by distinctive part identification codes, the components being capable of outputting readable signals corresponding to the part identification codes, the inspection system comprising a first subsystem that includes a component table that stores information corresponding to the part identification codes, a second subsystem that requests the components to output the readable signals to the inspection system, and a third subsystem that compares the signals output by the components with the information stored in the component table to determine whether the signals corresponding to the part identification codes that are received from the plurality of components are consistent with the part identification codes stored on the component table, and thereby confirm whether the plurality of components correspond to a preselected list of components.

2. The inspection system as set forth in claim 1, further comprising a fourth subsystem that indicates a result of the comparison made by the third subsystem.

3. The inspection system as set forth in claim 2, further comprising an inspection device, wherein the first subsystem, the second subsystem and the third subsystem are steps of a program installed in the inspection device.

4. The inspection system as set forth in claim 3, further comprising a fourth subsystem that indicates a determination by the third subsystem, wherein the fourth subsystem is an indicating unit defined at the inspection device.

5. The system of claim 1, wherein the part identification codes are chosen from the group consisting of magnetized codes, bar codes, optical codes and electronically readable codes.

6. The system of claim 1, wherein the component table comprises a list of all components of the watercraft and the outboard drive as set forth in the specifications for the watercraft and outboard motor.

7. An inspection method for a watercraft propelled by an outboard drive and having a plurality of components related to the watercraft and the outboard drive, the plurality of components identifiable by distinctive part identification codes, the components selectably outputting readable signals corresponding to the part identification codes, the method comprising storing information corresponding to the part identification codes in a component table, causing each of the components to output a respective readable signal to an inspection system, and comparing the signals sent by the components with the information in the component table to determine whether the signals corresponding to the part identification codes that are received from the plurality of components are consistent with the part identification codes stored on the component table to thereby confirm that the plurality of components correspond to a preselected list of components.

8. The inspection method as set forth in claim 7, further comprising indicating a result of the comparison.

9. The method of claim 7, wherein the part identification codes are chosen from the group consisting of magnetized codes, bar codes, optical codes and electronically readable codes.

10. The method of claim 7, wherein the component table comprises a list of all components of the watercraft and the outboard drive as set forth in the specifications for the watercraft and outboard motor.

11. A method for inspecting a watercraft propelled by an outboard drive and having a plurality of components related to the watercraft and the outboard drive, each of the plurality of components identifiable by a distinctive part identification code, comprising:

receiving readable signals corresponding to the part identification codes from the plurality of components;

comparing the received readable signal with previously stored part identification codes on a component table; and determining if said received readable signals are consistent with the part identification codes stored on the component table to thereby confirm that the plurality of components correspond to a preselected list of components.

12. The method of claim 11, further comprising outputting an inspection completion form.

13. The method of claim 11, further comprising outputting an abnormal condition indication if the received readable signals are not consistent with the previously stored part identification codes on the component table.

* * * * *

UNITED STATES PATENT AND TRADEMARK OFFICE

CERTIFICATE OF CORRECTION

PATENT NO. : 7,505,836 B2
APPLICATION NO. : 11/195246
DATED : March 17, 2009
INVENTOR(S) : Takashi Okuyama et al.

It is certified that error appears in the above-identified patent and that said Letters Patent is hereby corrected as shown below:

On the title page, item [73]: "Yamaha Hatsudoki Kabushiki Kaisha" as the assignee in the patent issuing from this application, pursuant to an assignment recorded prior to the issuance of the patent.

Please add "U.S. 5,245,321, Issued September 14, 1993, Jonker, et al." and "U.S. 5,633,573, Issued May 27, 1997, Kanno" to the list of references under U.S. Patent Documents, as they have been signed by the examiner but have not been incorporated in the Issued Patent.

At Drawing Sheet 3 of 8, line 7, please delete "Votlage" and insert --Voltage--, therefor.

At Drawing Sheet 3 of 8, line 2, please delete "Comparisions" and insert --Comparisons--, therefor.

At Drawing Sheet 8 of 8, line 2, please delete "Pourpose" and insert --Purpose--, therefor.

At Column 6, line 3, before "propeller", please delete "the".

At Column 13, line 32, please delete "B1 B2", and insert --B1 and B2--, therefor.

Signed and Sealed this

Twenty-sixth Day of January, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,505,836 B2
APPLICATION NO. : 11/195246
DATED : March 17, 2009
INVENTOR(S) : Takashi Okuyama and Isao Kanno It is certified that error appears in the above-identified patent and that said Letters Patent is hereby corrected as shown below:

On the title page, item [73] should read: --Yamaha Hatsudoki Kabushiki Kaisha-- as the assignee.

On the title page, item [56] insert: --U.S. 5,245,321, Issued September 14, 1993, Jonker, et al.-- and --U.S. 5,633,573, Kanno--.

At Drawing Sheet 3 of 8, line 7, please delete “Votlage” and insert --Voltage--, therefor.

At Drawing Sheet 3 of 8, line 2, please delete “Comparisions” and insert --Comparisons--, therefor.

At Drawing Sheet 8 of 8, line 2, please delete “Pourpose” and insert --Purpose--, therefor.

At Column 6, line 3, before “propeller”, please delete “the”.

At Column 13, line 32, please delete “B1 B2”, and insert --B1 and B2--, therefor.

Signed and Sealed this

Twenty-third Day of February, 2010

David J. Kappos
*Director of the United States Patent and Trademark Office*

UNITED STATES PATENT AND TRADEMARK OFFICE

CERTIFICATE OF CORRECTION

PATENT NO. : 7,505,836 B2
APPLICATION NO. : 11/195246
DATED : March 17, 2009
INVENTOR(S) : Takashi Okuyama et al.

It is certified that error appears in the above-identified patent and that said Letters Patent is hereby corrected as shown below:

This certificate vacates the Certificate of Correction issued February 23, 2010. The certificate is a duplicate of the Certificate of Correction issued January 26, 2010. All requested changes were included in the Certificate of Correction issued January 26, 2010.

Signed and Sealed this

Thirtieth Day of March, 2010

David J. Kappos
*Director of the United States Patent and Trademark Office*